(12) United States Patent  (10) Patent No.: US 8,272,504 B2
Neugebauer et al.  (45) Date of Patent: Sep. 25, 2012

(54) FASTENER ASSEMBLY FOR A CONVEYOR CHAIN, A CARRIER FOR USE WITH THE FASTENER ASSEMBLY AND METHOD FOR MODIFYING A CONVEYOR CHAIN

(75) Inventors: Jan Neugebauer, Sandared (SE); Lars Follin, Sjömarken (SE)

(73) Assignee: Jensen Sweden AB, Boras (SE)

( * ) Notice: Subject to any disclaimer, the term of this patent is extended or adjusted under 35 U.S.C. 154(b) by 343 days.

(21) Appl. No.: 12/598,892

(22) PCT Filed: May 4, 2007

(86) PCT No.: PCT/EP2007/054376
§ 371 (c)(1),
(2), (4) Date: Nov. 4, 2009

(87) PCT Pub. No.: WO2008/135088
PCT Pub. Date: Nov. 13, 2008

(65) Prior Publication Data
US 2010/0133072 A1  Jun. 3, 2010

(51) Int. Cl.
*B65G 29/00* (2006.01)
(52) U.S. Cl. .................................. 198/867.15; 198/685
(58) Field of Classification Search ............... 198/678.1, 198/685, 687, 712, 836.1, 850–853, 867.01, 198/867.15
See application file for complete search history.

(56) References Cited

U.S. PATENT DOCUMENTS

| | | | | |
|---|---|---|---|---|
| 1,422,151 A | * | 7/1922 | Walker | 198/712 |
| 4,171,739 A | * | 10/1979 | Yamato | 198/704 |
| 4,202,219 A | * | 5/1980 | Weis | 474/223 |
| 4,271,960 A | | 6/1981 | Chalich | |
| 4,501,351 A | * | 2/1985 | Tracy | 198/867.15 |
| 4,518,077 A | * | 5/1985 | Ronco et al. | 198/731 |
| 4,736,833 A | * | 4/1988 | Tanis | 198/719 |
| 4,950,398 A | * | 8/1990 | Wiegand et al. | 210/232 |

(Continued)

FOREIGN PATENT DOCUMENTS

DE  100 26 093 A1  11/2001

(Continued)

OTHER PUBLICATIONS

International Search Report from corresponding International Application No. PCT/EP2007/054376 dated Apr. 4, 2008.

(Continued)

*Primary Examiner* — Douglas Hess
(74) *Attorney, Agent, or Firm* — Alston & Bird LLP

(57) ABSTRACT

The present invention relates to a fastener assembly (1) for attaching a carrier (2) to a conveyor chain (3). The fastener assembly (1) comprises a first and a second link plate (4, 5), connected by means of link pins (9) such that they define between them an interspace (6). The first link plate (4) has an outer side (8). The fastener assembly (1) further comprises a fastener (10) for a carrier (2), which fastener (10) is attached to the first link plate (4) at the outer side (8) thereof by means of a retainer (11), which retainer (11) at least partially encompasses the first link plate (4) and extends into the interspace (6). The present invention also relates to a carrier (2) for use with the fastener assembly (1), a conveyor chain (3) comprising at least one fastener assembly (1) and a method for modifying a conveyor chain (3).

18 Claims, 3 Drawing Sheets

U.S. PATENT DOCUMENTS

| | | | |
|---|---|---|---|
| 5,730,280 A * | 3/1998 | Dalferth | 198/712 |
| 5,799,769 A | 9/1998 | Heer et al. | |
| 5,857,556 A * | 1/1999 | Bonacorsi | 198/683 |
| 5,857,558 A | 1/1999 | Irvine | |
| 6,170,642 B1 * | 1/2001 | Galan et al. | 198/678.1 |
| 6,170,650 B1 * | 1/2001 | Morikiyo et al. | 198/867.14 |
| 6,176,370 B1 * | 1/2001 | Davies | 198/867.15 |
| 6,269,934 B2 * | 8/2001 | Baker | 198/465.1 |
| 6,318,543 B1 | 11/2001 | Hicks | 198/800 |
| 6,471,041 B1 * | 10/2002 | Long et al. | 198/699.1 |
| 6,494,305 B1 * | 12/2002 | Black et al. | 198/349 |
| 6,615,974 B2 * | 9/2003 | Scholz | 198/712 |
| 6,669,011 B2 * | 12/2003 | Teuber | 198/867.14 |
| 6,964,550 B2 * | 11/2005 | Hafner | 414/21 |
| 7,325,674 B2 * | 2/2008 | Dufhaus | 198/867.14 |
| 7,377,378 B2 * | 5/2008 | Cash, III | 198/803.11 |
| 7,530,448 B2 * | 5/2009 | Henderson et al. | 198/699.1 |
| 7,717,253 B2 * | 5/2010 | Lord | 198/803.11 |
| 2005/0077153 A1 | 4/2005 | Krischer | |

FOREIGN PATENT DOCUMENTS

| | | |
|---|---|---|
| EP | 1 048 593 A | 11/2000 |
| WO | WO 99/03761 A | 1/1999 |

OTHER PUBLICATIONS

International Preliminary Report on Patentability from corresponding International Application No. PCT/EP2007/054376 dated Apr. 28, 2009.

* cited by examiner

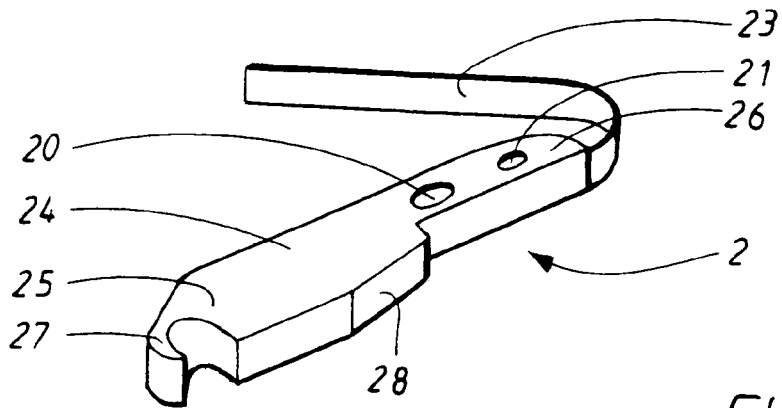
FIG.4
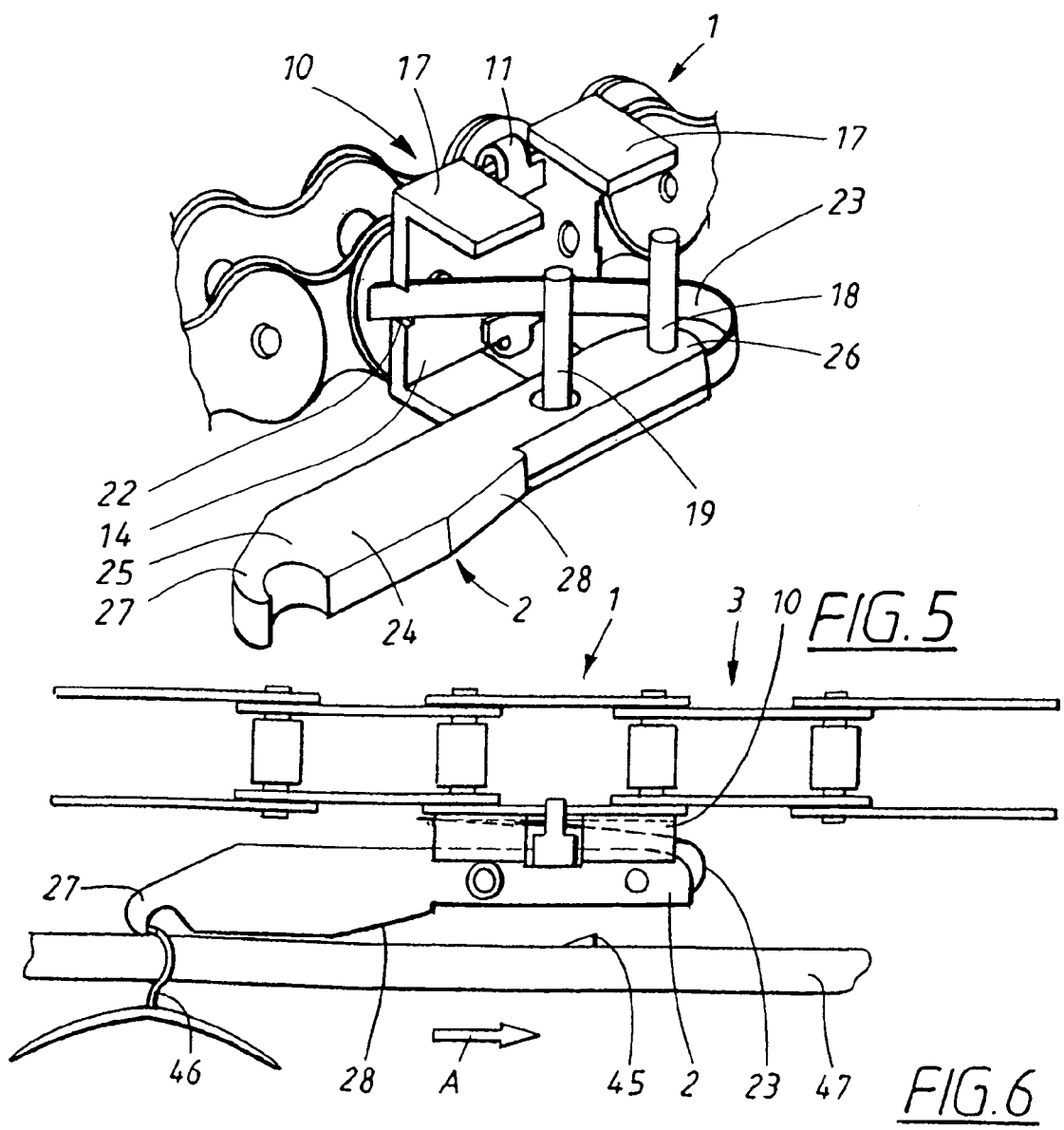
FIG.5
FIG.6

FASTENER ASSEMBLY FOR A CONVEYOR CHAIN, A CARRIER FOR USE WITH THE FASTENER ASSEMBLY AND METHOD FOR MODIFYING A CONVEYOR CHAIN

BACKGROUND OF THE INVENTION

1. Field of the Invention

The present invention relates to a fastener assembly for attaching a carrier to a conveyor chain, said conveyor chain comprising a plurality of link plates and link pins. The carrier is attached to the conveyor chain by means of a fastener.

The present invention also relates to a carrier for use with a fastener assembly of the above-mentioned kind. Such a carrier comprises a main body with a hook arranged to engage with an article to be conveyed.

Finally, the present invention relates to a method for modifying a conveyor chain.

2. Description of the Related Art

It is well known in the art to attach carriers for conveying articles, such as bottles, packages or hangers on racks, to conveyor chains by means of fasteners.

US patent application No. 2005/0077153 A1 discloses a conveyor chain system comprising a carrier, which is attachable to a fastener straddling a conveyor chain. Said conveyor chain comprises a plurality of link plates and link pins connecting said link plates, and said fastener is provided with holes or recesses on both sides for receiving said link pins.

This conveyor chain system is disadvantageous in that the fasteners are difficult to attach and remove, in particular when the chain itself is inaccessible. Furthermore, due to its design, this conveyor chain system can only be used in a limited field of applications.

A similar conveyor chain is disclosed in U.S. Pat. No. 4,271,960. This conveyor chain is provided with a fastener, which has a sleeve portion arranged to receive a pair of link pins for attaching said fastener to said conveyor chain and a carrier portion for engaging with a conveyor belt. This conveyor chain can also be employed to move an article such as a bottle, in which case the fastener acts directly on the bottle. The fasteners are either located in between two opposing link plates, or has spaced apart leg portions arranged to straddle said opposing link plates.

This conveyor chain has all the disadvantages associated with the above conveyor chain system. It is especially difficult to attach and remove the fasteners of this conveyor chain when they are located in between two opposing link plates, since this necessitates dismantling of the conveyor chain.

EP 1 048 593 discloses a conveyor chain with, in addition to the standard link plates and link pins, extended link pins, on which are mounted a plurality of fasteners in the form of plates. The fasteners are attached to the link plates on one side of the conveyor chain and a carrier, which may be a hook, is attached to each fastener.

Extended length link pins are also used for the fasteners attached to the conveyor chain disclosed in U.S. Pat. No. 5,857,558.

These conveyor chains are more adaptive than the previous ones. However, to attach the fasteners disclosed in these documents to a standard conveyor chain, the standard length link pins have to be replaced by extended length link pins, a complicated and time-consuming procedure which involves dismantling of said conveyor chain.

Finally, U.S. Pat. No. 5,799,769 discloses a carrier for use with a hanging conveyor system. The carrier has a receiving region with a U-shaped cross section for receiving a hanger hook and a head region arranged to interact with a conveyor. The receiving region contacts the hanger such that the hanger does not twist. The document also discloses methods for automatically loading and unloading the carrier with hangers, e.g. by using ascending and descending racks.

This carrier is designed to minimize swinging motions of hangers, and the document is silent on how to avoid the above-mentioned problems when attaching said carrier to said conveyor chain.

Thus, there is a demand for a fastener for attaching a carrier to a conveyor chain, which fastener is easily attached to and removed from said conveyor chain and which does not impair the functionality of said conveyor chain when mounted thereon.

SUMMARY OF THE INVENTION

Thus, a first object of the present invention is to provide a fastener assembly comprising a fastener fulfilling one or more of the above requirements.

A second object of the present invention is to provide a carrier for use with such a fastener assembly.

A third object of the present invention is to provide a conveyor chain comprising such a fastener assembly.

Finally, a fourth object of the present invention is to provide a method for modifying a conveyor chain to comprise such a fastener assembly.

The first object is achieved with a fastener assembly as claimed herein. Such a fastener assembly for attaching a carrier to a conveyor chain comprises a first link plate located in a position opposed to a second link plate, wherein said first and second link plates are arranged to define between them an interspace. The first link plate has an inner side facing towards the second link plate and an outer side facing away from the second link plate. The fastener assembly also comprises link pins connecting said link plates and a fastener for a carrier, wherein said fastener is attached to the first link plate at the outer side of said first link plate. The fastener is attached to the first link plate by means of a retainer, which at least partially encompasses said first link plate and extends into the interspace between said first and second link plates so as to attach the fastener to the first link plate.

The fastener is easily accessible due to its location at the outer side of the first link plate, and since the fastener is attached to the first link plate by means of a retainer, it is no longer necessary to dismantle the conveyor chain, for example to replace the link pins with extended length link pins, before attaching the fastener thereto. In other words, the fastener is easily attached and removed. Furthermore, attaching the fastener to the outer side of the first link plate reduces the height of the conveyor chain, and most importantly, the conveyor chain is now free to interact with gear wheels or the like on two sides, which makes it more adaptable to different operating conditions.

To make sure the retainer does not prevent gear wheels from meshing with the conveyor chain, it is advantageous if adjoining link plates are arranged adjacent to the inner side of said first link plate, and the retainer has a thickness at the inner side of said first link plate equal to or less than the thickness of said adjoining link plates. In other words, the retainer is arranged so that it is located between the ends of the adjoining link plates at the inner side of the first link plate, and does not protrude beyond the inner sides of said adjoining link plates.

In an alternative embodiment, the retainer may protrude slightly beyond the inner sides of the adjoining side plates.

The retainer may be integral with said fastener, which gives the advantage of having only one component to keep in place before the retainer is attached to the first link plate. Another advantage is reduced manufacturing costs, as material from the fastener, otherwise cut out to be discarded, may be used for the retainer.

However, the retainer may also be detachable from the fastener, which has the advantage that the retainer may be replaced without replacing the fastener.

The fastener may be a clamp, which is easy to use. However, the retainer may also be a string or the like, wound around the fastener and the first link plate. The retainer may also advantageously be used in combination with an adhesive applied between the first link plate and the fastener.

To reduce the stresses occurring during bending of the retainer, it is advantageous if a bent portion of the retainer has a width, measured in the longitudinal direction of the conveyor chain, narrower than the width of another portion of said retainer.

Fastener assembly according to any of the preceding claims, wherein said carrier is integral with said fastener.

It is advantageous if the carrier is removably attached to said fastener, as this makes it possible to replace the carrier without replacing the fastener, which may be desirable if the mounted carrier is broken or if a carrier of different design is required. However, the carrier may also be integral with said fastener, which facilitates a simple mounting procedure.

Advantageously, at least one of said link pins protrudes from said first link plate (normally, both link pins do) and the fastener comprises a base plate, which is provided with at least one link pin aperture for receiving said at least one link pin. With this arrangement, the link pins may carry loads acting on the fastener, and the result is a more rigid construction. This also makes it possible to adapt the retainer to carry loads perpendicular to the outer side of the first link plate only.

In one embodiment, the fastener comprises first and second opposing wall portions protruding from said base plate, wherein said first wall portion is provided with a pivot pin extending towards the second wall portion and intended to engage with a pivot pin aperture in said carrier. The pivot pin, which holds the mounted carrier in place, makes it easy to mount said carrier on the fastener.

Said first wall portion may further be provided with a locking pin extending towards said second wall portion, intended to engage with a locking pin aperture in said carrier to limit pivotal movement of said carrier on said pivot pin.

It is favourable if the base plate is provided with a notch for receiving a resilient element of said carrier to limit lateral movement of said carrier, as this helps to stabilize the carrier on the fastener.

The second object of the present invention is achieved with a carrier as claimed herein. Said carrier comprises a main body, said main body having a hook arranged to engage with an article to be conveyed. The main body is provided with a pivot pin aperture, arranged to receive said pivot pin of said fastener to allow pivotal movement of said carrier on said pivot pin. Further, a resilient element is arranged between said carrier and said fastener, which resilient element is arranged to pivot said carrier on said pivot pin.

Thus, a carrier is provided, which in an easy manner may be shifted from an engaging position, in which it engages with an article to be conveyed, to a disengaging position, in which it is disengaged from said article.

As mentioned above, it is advantageous if the carrier comprises a locking pin aperture arranged to receive the locking pin of the fastener to limit pivotal movement of said carrier on said pivot pin.

The main body may advantageously comprise an oblique surface arranged to interact with an external object to pivot the carrier on said pivot pin of the fastener, in order to lift the hook to disengage said hook with said article. This design ensures that the hook will disengage with the article before the article comes to a halt, which reduces the forces acting on the carrier. It also makes possible a more automated conveyor system.

The third object of the present invention is achieved with a conveyor chain as claimed herein, which comprises at least one fastener assembly as described above.

A carrier may be removably attached to said fastener.

The fourth and last object of the present invention is achieved with a method as claimed herein for modifying a conveyor chain. The conveyor chain comprises a plurality of link plates arranged in pairs and connected by link pins so as to form a continuous chain, wherein at least one first pair of link plates comprises a first link plate and a second link plate, wherein said first and second link plates are arranged to define between them an interspace and said first link plate has an inner side facing towards said second link plate and an outer side facing away from said second link plate. The method comprises the step of attaching a fastener to said first link plate by means of a retainer, by arranging said retainer so that it at least partially encompasses said first link plate and extends into the interspace between said first and second link plates. With this method, the fastener is easily attached to and removed from said conveyor chain.

The retainer is advantageously attached so as to not protrude, at the inner side of said link plate, beyond inner sides of adjoining link plates arranged adjacent to the inner side of said first link plate. With this arrangement, the retainer does not prevent gear wheels from meshing with the conveyor chain.

Finally, the method also may comprise the step of removably attaching a carrier to said fastener.

BRIEF DESCRIPTION OF THE DRAWINGS

The invention will now be explained in further detail with reference to the accompanying drawings, wherein:

FIG. 4 shows a perspective view of a carrier according to the present invention;

FIG. 5 shows a perspective view of the carrier of FIG. 4 mounted on the fastener assembly of FIG. 3;

FIG. 6 shows a side view of the conveyor chain of FIG. 1 with the carrier of FIG. 4 attached thereto, said carrier interacting with a hanger to be conveyed.

DETAILED DESCRIPTION

Figure 1:
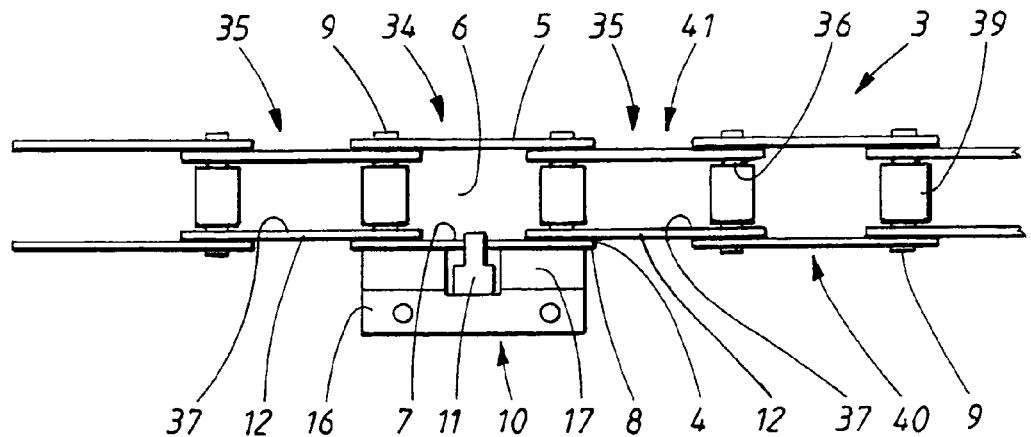
FIG. 1 shows a side view of a fastener assembly according to the present invention mounted on a conveyor chain.

A standard conveyor chain 3 comprises a plurality of elongated link plates. Said link plates are arranged in pairs of pin link plates and roller link plates 40, 41, wherein the roller link plates of a pair of roller link plates 41 are arranged between, or inside of, pin link plates of an adjacent pair of pin link plates 40. The pin link plates of a pair of pin link plates 40 are connected by means of two pin links 9 penetrating holes in front and rear ends of said pin link plates, and the roller link plates of a pair of roller link plates 41 are connected by means of bushings 36 penetrating holes in front and rear ends of said roller link plates. On each bushing 36 is mounted a roller 39.

Each link pin 9 connecting a pair of pin link plates extends through one of the bushings 36 connecting an adjoining pair of roller link plates, connecting said pair of link plates 40, 41 so that a continuous chain 3 of alternating pairs of pin link plates 40 and roller link plates 41 is formed.

Figure 3:
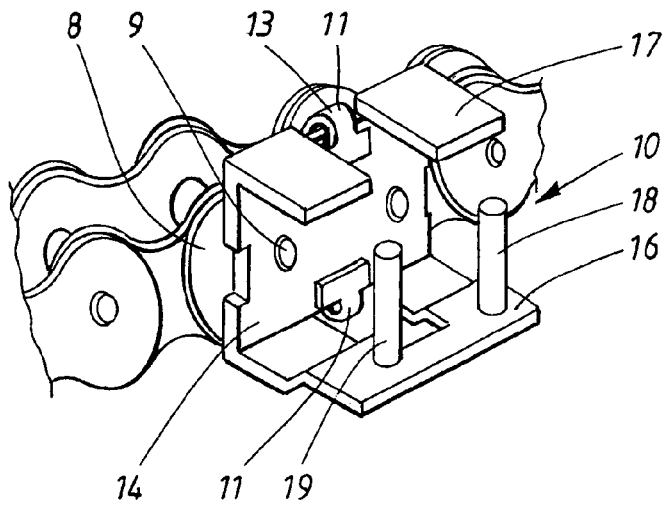
FIG. 3 shows a perspective view of the fastener assembly and the conveyor chain of FIG. 1.

Referring to FIG. 1, it is shown a conveyor chain 3 of the above-described kind comprising a first pair of link plates 34 of the pin link plate type, to which is attached a fastener 10 for a carrier, and second pairs of link plates 35 of the roller link plate type, located adjacent to said first pair of link plates 34. Said first pair of link plates 34 comprises a first link plate 4 located in a position opposed to a second link plate 5, wherein said first and second link plates are connected by means of link pins 9 such that they define between them an interspace 6. Said first link plate 4 has an inner side 7 facing towards the second link plate 5 and an outer side 8 facing away from the second link plate. The fastener 10 is attached to the first link plate 4 at the outer side 8 thereof by means of a retainer 11 in the form of a detachable clamp, which retainer extends through the interspace 6 to the outer side of said first link plate, where it engages with the fastener through slits in a first and second wall portion 16, 17 of said fastener (FIG. 3).

Although the retainer in FIG. 1 is a clamp, any kind of retainer, e.g. a string or the like wound around said fastener and said first link plate, can be used to attach said fastener to said link plate. Furthermore, the retainer, although illustrated as only partially encompassing said first link plate, may extend all the way around said first link plate. Said retainer may also be combined with an adhesive or the like applied between the first link plate and the fastener.

Also, in another embodiment, the retainer may be integral with said fastener, in which case the fastener, for example, may be provided with at least one extension arm, projecting from a top or bottom of said fastener and which is bent around the first link plate to clamp together said first link plate and said fastener.

Said first pair of link plates 34, the link pins 9 connecting said link plates, the fastener 10 and the retainer 11 constitutes a fastener assembly 1.

During use of the conveyor chain 3, the interspace 6 between the first and second link plate 4, 5 usually at some point receives a tooth (not shown) of a gear wheel or the like, interacting with one of the rollers 36 for driving the conveyor chain forward. Therefore, the retainer 11 is so arranged, that it does not obstruct access to said interspace 6 for said tooth, as may be understood from at least FIG. 7. This is, in the embodiment shown in FIGS. 1 and 7, achieved by attaching said fastener 10 to a pin link plate 4 and by using a retainer 11 having a thickness, measured in a direction normal to the inner side 7 of the first link plate 4, at the inner side of said first link plate 4 such that said retainer does not protrude into said interspace beyond inner sides 37 of adjoining link plates 12, adjacent to said first link plate 4 and located between said first and second link plates 4, 5, and a width, measured in the longitudinal direction of the conveyor chain, such that the retainer fits between said adjoining link plates.

As shown in FIG. 3, the bent portions 13 of the retainer 11 have a slender design, which reduces the stresses that occur during bending of said retainer. The slender design also has the advantage of reducing the amount of material used for the retainer, and thus the manufacturing costs. The end portions of said retainer are somewhat wider than the bent portions, which makes the retainer easy to grip during bending. Of course, in another embodiment, the retainer may have any suitable design, as long as it attaches said fastener to said first link plate.

Figure 2:
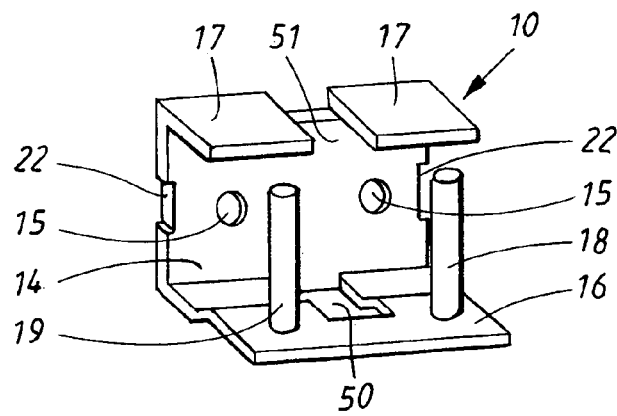
FIG. 2 shows a perspective view of a fastener according to the present invention.

Now referring to FIGS. 2 and 3, the fastener 10 comprises a base plate 14 to be attached to said first link plate and first and second wall portions 16, 17 extending essentially perpendicular to said base plate from opposite sides thereof. Two link pin apertures 15 are formed in said base plate 14, for receiving the link pins 9 protruding from said first link plate. These link pin apertures 15 are shown as through holes, but may in another embodiment be bottom holes (or be removed altogether). The link pins 9 limit lateral movement of said fastener 10, i.e. movement in a plane parallel with the outer side 8 of said first link plate, and thus allow a reduction of the dimensions of the retainer 11, the primary function of which is to prevent the fastener from moving in a direction normal to the outer side of said first link plate. The base plate is further provided with two notches 22 for receiving a resilient element.

The wall portions 16, 17 are provided with a first and a second slit 50, 51 for receiving said retainer 11, which first and second slits 50, 51 extend across part of the first wall portion 16 and across the entire second wall portion 17, respectively. In another embodiment, slits for the retainer may also be formed in the base plate. Of course, the shape of said slits may vary according to requirements.

The first wall portion 16 is provided with a pivot pin 18 and a locking pin 19, which pins 18, 19 extend in a direction essentially normal to said first wall portion 16 and inwards with respect to the fastener 10.

In order to facilitate mounting of the carrier, the second wall portion 17 does not extend above said pivot and locking pins 18, 19. However, it may do so in another embodiment, provided that there remains enough space between the second wall portion and the pivot and locking pins for inserting said carrier.

The carrier 2, shown in FIG. 4, has en elongated main body 24 with a first end 25 and a second end 26, opposed to said first end 25. The main body is provided with a pivot pin aperture 21 at said second end 26, which pivot pin aperture 21 is arranged to receive said pivot pin 18, and a locking pin aperture 20, arranged to receive said locking pin 19, when said carrier is mounted on said fastener. The pivot pin aperture 21 allows the carrier 2 to pivot on said pivot pin, while the locking pin aperture 20, which has a diameter somewhat larger than the diameter of the locking pin, limits the pivotal movement of said carrier. The holes are shown as through holes, but they may in another embodiment be bottom holes, as long as they are sufficiently deep to hold the carrier in place.

The main body 24 is further, at said first end 25, provided with a hook 27 for engaging with an article to be conveyed and attached to said second end 26 is a bent resilient element 23, which projects from said second end in the longitudinal direction of the carrier 2 and then extends in a direction backwards along the main body 24, so that it, when said carrier 2 is mounted on said fastener 10, is located between said carrier and said fastener. The resilient element 23 is arranged to engage with one of the notches 22 in the base plate, preferably with a close fit, to limit lateral movement of the carrier 2. In use (FIG. 5) the resilient element 23 acts on said base plate 14, pivoting the carrier 2 on the pivot pin 18, located between said hook 27 and said second end 26, such that the hook is forced in a direction away from said fastener 10.

The carrier may of course have a different design than the one shown in FIG. 4. For example, the hook may be located elsewhere on the main body and the same goes for the pivot pin and locking pin apertures, as long as they maintain a minimum mutual distance.

The resilient element 23 shown in the figures is a leaf spring. However, the skilled person realizes that any kind of resilient element, e.g. a coil spring, is applicable. Furthermore, the resilient element may act on any part of the carrier, as long as it pivots the carrier on said pivot pin. It is also important to emphasize that the resilient element does not have to be attached to the main body of said carrier; it may also be attached to said fastener, in which case the carrier may be provided with a notch of the above-mentioned kind.

As mentioned above, the base plate 14 in FIG. 2 is provided with two notches 22. This has the advantage that the orientation of the carrier may be inverted with the hook facing in the opposite direction, in which case the pivot pin acts like the locking pin and vice versa. However, one or both of these notches can be omitted.

The carrier 2 in FIG. 4 also has an oblique surface 28, the function of which will be described in detail below.

FIG. 6 shows a conveyor chain 3 of the above-described kind for conveying hangers 46 on a rack 47. The conveyor chain 3 is driven forward in the direction indicated by arrow A by means of a driving device (not shown). The conveyor chain 3 comprises several fastener assemblies, of which only one fastener assembly 1 is shown, which fastener assembly comprises a fastener 10, to which is attached a carrier 2.

The resilient element 23 pushes the hook 27 against the rack 47, so that the hook, when it reaches the hanger 46, engages with said hanger and moves the hanger in the direction indicated by arrow A. When the oblique surface 28 of the carrier 2 hits an external object, in this case a projection 45, the hook 27 is lifted out of engagement with the hanger 46, after which the carrier continues down the rack without the hanger.

It is understood, that the projection on the rack may have any conceivable shape, as long as it moves the hook out of engagement with the hanger. Another possibility is that the carrier is pivoted when it comes into contact with another hanger, or when the conveyed hanger comes to a halt (in which case the hook has a shape which allows it to slide over said hanger when resistance is encountered).

Although the above-described conveyor chain is primarily intended for conveying hangers on racks, it may nevertheless be used to convey any kind of articles. The above-described carrier may also be replaced with any kind of known carrier for conveying, for example, bottles, clothes, meat etc., provided that said carrier has at least one hole for receiving one of the pins on said first wall portion of the fastener.

Below, with reference to FIG. 1-5, is explained a method for modifying a standard conveyor chain 3 of the kind initially described in the detailed description. Such a conveyor 3 chain comprises a plurality of pairs of link plates 34, 35, of which at least one 34 has a first and a second link plate 4, 5 defining between them an interspace 6. Each first link plate 4 has an inner side 7 and an outer side 8. The method comprises the steps of placing the fastener 10 at said first link plate 4 and removably or permanently attaching the fastener to said first link plate 4 using a retainer 11 of the above described kind, for example by clamping together said first link plate and said fastener, such that the retainer at least partially encompasses said first link plate and extends into the interspace 6 between said first and second link plates.

Figure 7:
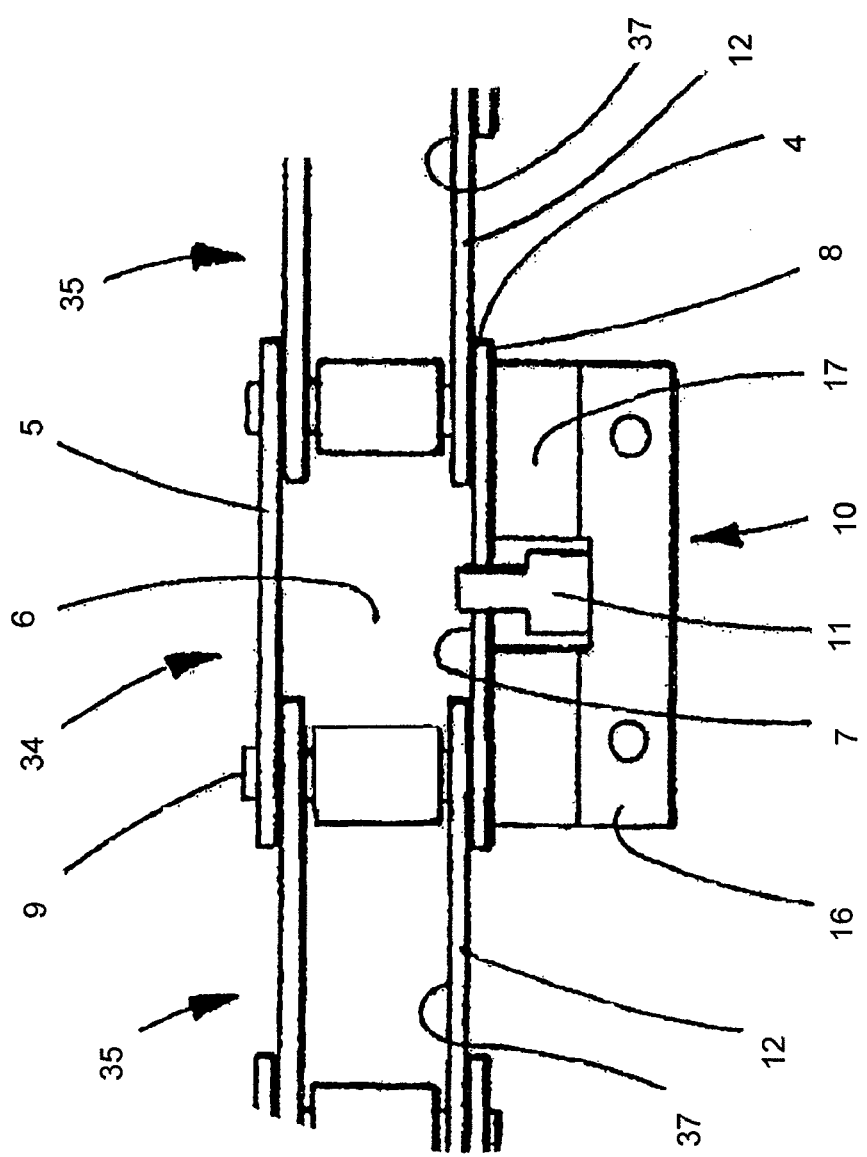
FIG. 7 shows a blown-up, detailed side view of a retainer (11) of the fastener assembly of FIG. 1.

Again, as may be understood from FIGS. 1 and 7, it is advantageous if the retainer 11 does not project, at the inner side 7 of said first link plate 4, beyond the inner sides 37 of the adjoining link plates 12.

In FIGS. 1, 3, 5, 6, and 7, the fastener is shown attached to a pin link plate. It is, since the pin link plates are located outside of adjoining roller link plates, with this arrangement possible to arrange the retainer such that it does not protrude into the space intended for a gear wheel tooth. This is, as mentioned above, achieved by using a retainer having a thickness less than the thickness of said adjoining roller link plates.

In another embodiment, the retainer may protrude slightly beyond the inner sides of said adjoining roller link plates, as long as it does not obstruct an object intended to engage with the rollers of said conveyor chain.

In yet another embodiment, the retainer may abut against inner sides of the adjoining roller link plates, as long as it does not obstruct an object intended to engage with the rollers of said conveyor chain.

Furthermore, as long as the retainer is sufficiently thin, the first link plate, to which the fastener is attached, may be a roller link plate, in which case the fastener either abuts against the outer sides of adjoining pin link plates, arranged adjacent to and outside of said roller link plate, or is sufficiently narrow to fit between said pin link plates, abutting against said roller link plate.

To sum up, the thickness of a retainer for attaching a fastener to a first link plate is advantageously rather small and most advantageously less than the thickness of adjoining link plates adjacent to said first link plate.

Finally, although the above-described carrier is detachable from said fastener, it may also be integral with said fastener.

The invention claimed is:

1. A fastener assembly (1) for attaching a carrier (2) to a conveyor chain (3), said fastener assembly (1) comprising:
   a first link plate (4);
   a second link plate (5), the first link plate (4) located in a position opposed to the second link plate (5), wherein said first and second link plates (4, 5) are arranged to define between them an interspace (6), said first link plate (4) having an inner side (7) facing towards the second link plate (5) and an outer side (8) facing away from the second link plate (5);
   link pins (9) connecting said link plates (4, 5); and
   a fastener (10) for a carrier (2), wherein said fastener (10) is attached to the first link plate (4) at the outer side (8) of said first link plate (4) by means of a retainer (11), which at least partially encompasses said first link plate (4) and extends into the interspace (6) between said first and second link plates (4, 5) so as to attach the fastener (10) to the first link plate (4), wherein adjoining link plates (12) are arranged adjacent to the inner side (7) of said first link plate (4), and that said retainer (11) has a thickness at the inner side (7) of said first link plate (4) equal to or less than the thickness of said adjoining link plates (12).

2. The fastener assembly (1) according to claim 1, wherein the retainer (11) is integral with said fastener (10).

3. The fastener assembly (1) according to claim 1, wherein the retainer (11) is detachable from the fastener (10).

4. The fastener assembly (1) according to claim 1, wherein the retainer (11) is a clamp.

5. The fastener assembly (1) according to claim 1, wherein said retainer (11) comprises a bent portion (13) having a width narrower than the width of another portion of said retainer (11).

6. The fastener assembly (1) according to claim 1, wherein said carrier (2) is integral with said fastener (10).

7. The fastener assembly (1) according to claim 1, wherein said carrier (2) is removably attached to said fastener (10).

8. The fastener assembly (1) according to claim 1, wherein at least one of said link pins (9) protrudes from said first link plate (4) and the fastener (10) comprises a base plate (14), which is provided with at least one link pin aperture (15) for receiving said at least one link pin (9).

9. The fastener assembly (1) according to claim 8, wherein said fastener (10) comprises first and second opposing wall portions (16, 17) protruding from said base plate (14), and wherein said first wall portion (16) is provided with a pivot pin (18) extending towards the second wall portion (17) and intended to engage with a pivot pin aperture (21) in said carrier (2).

10. The fastener assembly (1) according to claim 9, wherein said first wall portion (16) is provided with a locking pin (19) extending towards said second wall portion (17), intended to engage with a locking pin aperture (20) in said carrier (2) to limit pivotal movement of said carrier (2) on said pivot pin (18).

11. The fastener assembly (1) according to claim 8, wherein said base plate (14) is provided with a notch (22) for receiving a resilient element (23) of said carrier (2) to limit lateral movement of said carrier (2).

12. A carrier (2) for use with a fastener assembly (1) according to claim 1, said carrier (2) comprising:
a main body (24), said main body (24) having a hook (27) arranged to engage with an article to be conveyed, said main body (24) provided with a pivot pin aperture (21), arranged to receive said pivot pin (18) of said fastener (10) to allow pivotal movement of said carrier (2) on said pivot pin (18), and a resilient element (23) arranged between said carrier (2) and said fastener (10), which resilient element (23) is arranged to pivot said carrier (2) on said pivot pin (18).

13. A carrier (2) according to claim 12, which carrier (2) comprises a locking pin aperture (20) arranged to receive the locking pin (19) of the fastener (10) to limit pivotal movement of said carrier (2) on said pivot pin (18).

14. A carrier (2) according to claim 12, wherein the main body (24) comprises an oblique surface (28) arranged to interact with an external object to pivot the carrier (2) on said pivot pin (18) of the fastener (10), in order to lift the hook (27) to disengage said hook (27) with said article.

15. A conveyor chain (3), comprising:
a plurality of fastener assemblies, each said fastener assembly (1) comprising:
a first link plate (4);
a second link plate (5), the first link plane (4) located in a position opposed to the second link plate (5), wherein said first and second link plates (4, 5) are arranged to define between them an interspace (6), said first link plate (4) having an inner side (7) facing towards the second link plate (5) and an outer side (8) facing away from the second link plate (5);
link pins (9) connecting said link plates (4, 5); and
a fastener (10) for a carrier (2), wherein said fastener (10) is attached to the first link plate (4) at the outer side (8) of said first link plate (4) by means of a retainer (11), which at least partially encompasses said first link plate (4) and extends into the interspace (6) between said first and second link plates (4, 5) so as to attach the fastener (10) to the first link plate (4), wherein adjoining link plates (12) are arranged adjacent to the inner side (7) of said first link plate (4), and that said retainer (11) has a thickness at the inner side (7) of said first link plate (4) equal to or less than the thickness of said adjoining link plates (12).

16. A conveyor chain (3) according to claim 15, wherein a carrier (2) is removably attached to said fastener (10).

17. A method for modifying a conveyor chain (3), which conveyor chain (3) comprises a plurality of link plates arranged in pairs and connected by link pins so as to form a continuous chain, wherein at least one first pair of link plates (34) comprises a first link plate (4) and a second link plate (5), wherein said first and second link plates (4, 5) are arranged to define between them an interspace (6) and said first link plate (4) has an inner side (7) facing towards said second link plate (5) and an outer side (8) facing away from said second link plate (5), said method comprising the step of attaching a fastener (10) to said first link plate (4) by means of a retainer (11), by arranging said retainer (11) so that it at least partially encompasses said first link plate (4) and extends into the interspace (6) between said first and second link plates (4, 5) wherein said retainer (11) is attached so as to not protrude, at the inner side (7) of said link plate (4), beyond inner sides (37) of adjoining link plates (12) arranged adjacent to the inner side (7) of said first link plate (4).

18. The method according to clam 17, further comprising the step of removably attaching a carrier (2) to said fastener (10).

* * * * *